(12) United States Patent
Fösel

(10) Patent No.: US 8,430,659 B2
(45) Date of Patent: Apr. 30, 2013

(54) CORRUGATOR DEVICE WITH A GRIPPER

(75) Inventor: Stefan Fösel, Breitbrunn (DE)

(73) Assignee: Unicor GmbH (DE)

( * ) Notice: Subject to any disclaimer, the term of this patent is extended or adjusted under 35 U.S.C. 154(b) by 395 days.

(21) Appl. No.: 12/682,634

(22) PCT Filed: Jun. 6, 2008

(86) PCT No.: PCT/EP2008/004542
§ 371 (c)(1),
(2), (4) Date: Jul. 29, 2010

(87) PCT Pub. No.: WO2009/049692
PCT Pub. Date: Apr. 23, 2009

(65) Prior Publication Data
US 2010/0291254 A1    Nov. 18, 2010

(30) Foreign Application Priority Data

Oct. 12, 2007    (DE) .......................... 10 2007 049 656

(51) Int. Cl.
*B29C 47/90*    (2006.01)
(52) U.S. Cl.
USPC ........ 425/186; 425/326.1; 425/336; 425/369; 425/392; 425/396
(58) Field of Classification Search .................. 425/186, 425/326.1, 336, 369, 380, 392, 396
See application file for complete search history.

(56) References Cited

U.S. PATENT DOCUMENTS 4,212,618 A    7/1980    Hegler et al.
4,787,598 A    11/1988   Rahn et al.
5,510,071 A *  4/1996    Van Wonderen et al. ..... 264/166
5,522,718 A    6/1996    Dietrich
5,560,941 A *  10/1996   Hegler et al. ................. 425/185

(Continued)

FOREIGN PATENT DOCUMENTS

CN    2635335 Y    8/2004
DE    20104922 U1  7/2002

(Continued)

OTHER PUBLICATIONS

Office Action from German Patent Application No. 10 2007 049 656.9-16 dated Oct. 15, 2008.

(Continued)

*Primary Examiner* — Yogendra Gupta
*Assistant Examiner* — Joseph Leyson
(74) *Attorney, Agent, or Firm* — Lerner, David, Littenberg, Krumholz & Mentlik, LLP

(57) ABSTRACT

A corrugator device for shaping thermoplastic corrugated pipes out of a molten plastic tube issuing from an extrusion device may include moving molding jaws which circulate in a linear molding section and are arranged in paired successive relationship in the molding section forming a molding passage. The pairs of molding jaws may be formed from left-hand and right-hand molding jaws and between them enclose a cylindrical mold cavity to form the molding passage. The device may include a gripper device for guiding the molding jaws from the end of the molding section back to the start of the molding section, and having grippers respectively for the left-hand and the right-hand molding jaws, each with a separate guide and drive device.

16 Claims, 7 Drawing Sheets

U.S. PATENT DOCUMENTS

| | | |
|---|---|---|
| 2002/0113339 A1 | 8/2002 | Starita |
| 2002/0125609 A1 | 9/2002 | Hegler |
| 2002/0136791 A1 | 9/2002 | Dietrich et al. |
| 2006/0134256 A1 | 6/2006 | Hofmann |
| 2008/0118596 A1 | 5/2008 | Hetzner et al. |

FOREIGN PATENT DOCUMENTS

| | | |
|---|---|---|
| DE | 102004040019 A1 | 3/2006 |
| EP | 0007556 A1 | 2/1980 |
| RU | 2005121532 A | 2/2006 |

OTHER PUBLICATIONS

International Search Report PCT/EP2008/004542 dated Dec. 22, 2008.

\* cited by examiner

CORRUGATOR DEVICE WITH A GRIPPER

CROSS REFERENCE TO RELATED APPLICATIONS

The present application is a national phase entry under 35 U.S.C. §371 of International Application No. PCT/EP2008/004542, filed Jun. 6, 2008, published in German, which claims the benefit of German Patent Application No. 10 2007 049 656.9, filed Oct. 12, 2007. The disclosures of said applications are incorporated by reference herein.

BACKGROUND OF THE INVENTION

1. Field of the Invention

The invention concerns a corrugator device for shaping thermoplastic corrugated pipes out of a molten plastic tube issuing from an extrusion device comprising molding jaws which are guided in a circulating fashion in a linear molding section and arranged in paired successive relationship in the molding section form a molding passage, wherein the pairs of molding jaws are formed from left-hand and right-hand molding jaws and between them enclose a cylindrical mold cavity to form the molding passage, and grippers for guiding the molding jaws from the end of the molding section back to the start of the molding section.

2. Description of the Related Art

Known corrugator devices which use grippers for the return movement of the molding jaws provide structurally highly complicated and expensive gripper structures having pivot arms. The pivot arms are movable by a complicated and expensive mechanism and require a relatively large amount of structural space so that in the two known constructions the machine table cannot be used completely as a plane of movement of the molding jaws.

SUMMARY OF THE INVENTION

The object of the invention is to provide a corrugator device of the kind set forth in the opening part of this specification which when using a gripper device is of a structurally simple configuration and affords good utilisation of surface area for the movement of the molding jaws.

That object is attained by the subject-matter of the claims.

The fact that the grippers have guide and drive devices which respectively have an X-guide device, that is to say a guide device extending in the X-direction, and a Y-guide device, that is to say a guide device extending in the Y-direction, which are provided separately from each other, for example in each case as separate rail devices, provides the prerequisite for good surface area utilisation for the movement of the molding jaws. In addition by virtue of that division into linear guide devices, it is possible to dispense with pivot arms for actuation of the gripper.

The X-guide device or the Y-guide device can be arranged fixedly, that is to say stationarily, for example on the machine table. With a stationary arrangement of the X-guide device the Y-guide device is coupled to the X-entrainment member of the X-guide device and the gripper is connected to the Y-entrainment member of the Y-guide device. The term X-entrainment member is used to denote an entrainment member guided along the X-guide device in the X-direction and the term Y-entrainment member is used to denote an entrainment member guided along the Y-guide device in the Y-direction. With an alternative stationary arrangement of the Y-guide device the X-guide device is coupled to the Y-entrainment member and the X-entrainment member is connected to the gripper. In both cases it is possible to dispense with complicated pivotal or shearing mechanisms and the guides of the gripper can be embodied exclusively by way of linear guide devices in the X- and Y-directions.

The motor drive for the gripper can be effected by way of servo motors, more specifically each gripper can have 2 servo motors, namely a servo motor in the X-direction and a servo motor in the Y-direction. The servo motor in the X-direction can be arranged on the guide housing of the X-guide device and drive the X-entrainment member. The other servo motor for the Y-direction can be arranged on the guide housing of the Y-guide device and drive the Y-entrainment member. Respective linear drive outputs are preferably involved as the drive output member, for example a driven screwthreaded spindle or a drive belt which is driven in linearly circulating fashion and which is guided along the guide in question.

A structurally simple engagement mechanism of the gripper can be embodied if it is provided that the gripper has a gripper head which has at least one latching pin or latching clamp device for engagement with the molding jaws, preferably actuable by a motor. The latching pin or latching clamp device can be provided with latching pins or clamps which are movable in mutually opposite relationship and can be actuable by way of an elbow lever mechanism driven by the motor. Preferably the molding jaws have a structurally simple latching hole device which can operationally reliably co-operate with the latching pin or latching clamp device.

DESCRIPTION OF THE DRAWINGS

Further structural features and functions will be apparent from the description hereinafter of an embodiment by way of example with reference to the Figures. In the Figures.

DETAILED DESCRIPTION

Figure 1:
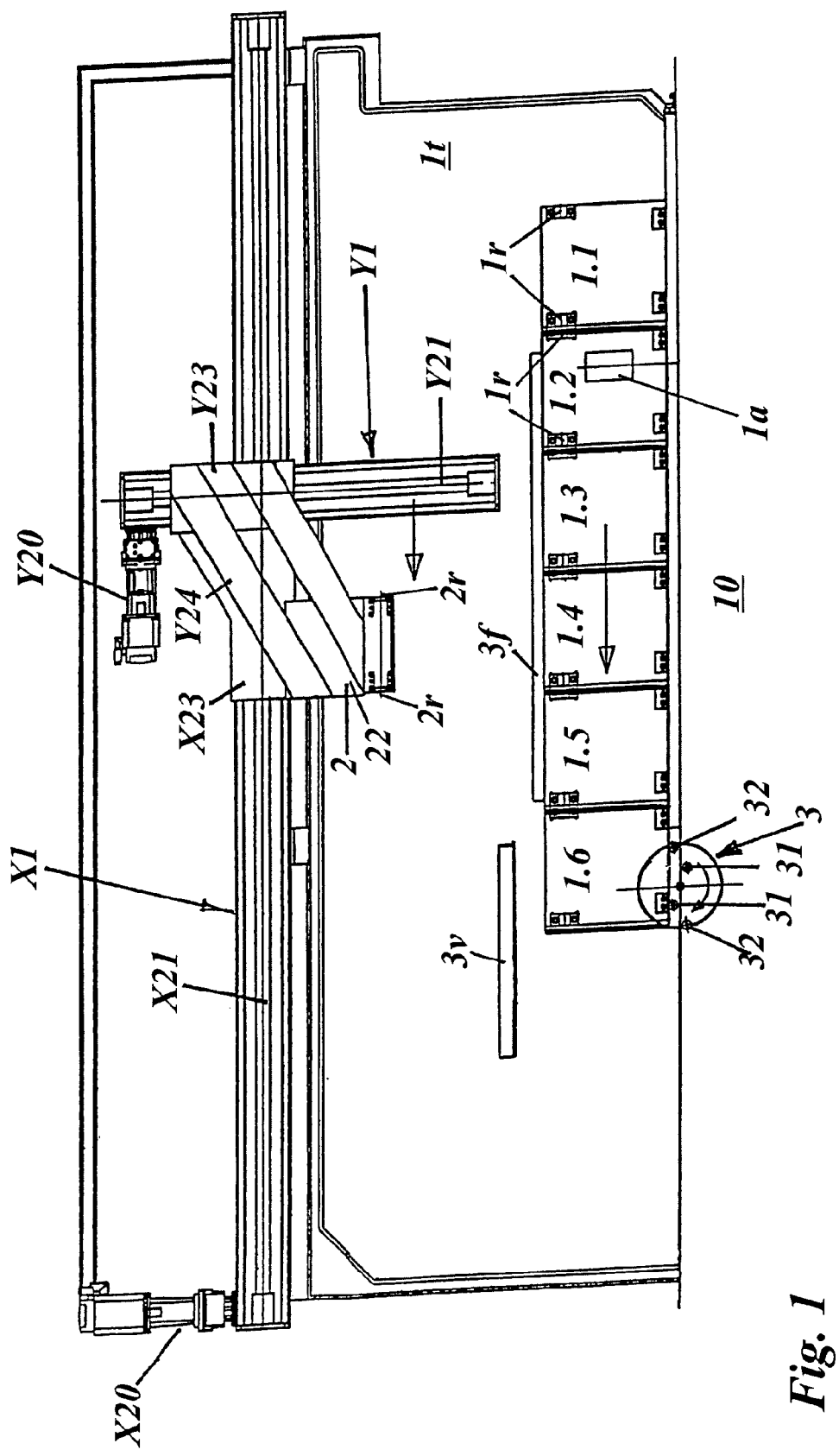
FIGS. 1 through 7 show a plan view of a right-hand half of the machine table of a corrugator device with right-hand molding jaws guided on the machine table, with six molding jaws arranged in a linear molding section, having a gripper with associated guide and drive device for the return movement of the molding jaws and a demolding device with a rotary disk device in seven successive process stages in demolding and return movement of the molding jaws.

FIGS. 1 through 7 show only the right-hand half of the machine table of the corrugator. Only the right-hand molding jaws 1.1 through 1.6 are shown in this right-hand half. They are arranged in succession in the linear molding section 10. They form a linear molding passage, together with the left-hand molding jaws (not shown), in the molding section 10. The left-hand half (not shown in the Figures) of the machine table therefore has a corresponding arrangement of the left-hand molding jaws, like the right-hand arrangement shown in the Figures. In addition the left-hand half of the machine table also has a gripper device for the return movement of the left-hand molding jaws, which is of a configuration corresponding to the gripper device shown in the Figures for the right-hand molding jaws.

The embodiment of the corrugator illustrated in the Figures has a horizontal machine table 1t on which, in the illustrated case, six pairs of molding jaws are guided in a linear molding section 10 in succession in a row in advancing relationship along a fixed guide bar 1f. Each pair of molding jaws is respectively formed from a left-hand and a right-hand molding jaw 1.1 through 1.6. They respectively enclose a cylindrical mold cavity. The six pairs of molding jaws which are guided in a row in the linear molding section 10 form a continuous molding passage in the molding section. It is composed of the axially mutually adjoining cylindrical mold cavities of the pairs of molding jaws.

The pairs of molding jaws in the linear molding section are driven by way of a drive device arranged in the machine table 1t for linear movement along the molding section 10. For that purpose the molding jaws 1 each have at their bottom a toothed rack with which the drive output pinion 1a of the drive motor, that engages through the machine table, meshes.

The return movement of the molding jaws 1.1 through 1.6 from the end to the beginning of the molding section 10 is effected by way of motor-driven grippers 2. The molding section 10 with the molding passage is arranged on the longitudinal central axis of the machine table 1t. The return movement of the right-hand molding jaws is effected on the right of the molding section 10 on the right-hand half of the machine table 1t and in a corresponding manner the return movement of the left-hand molding jaws is effected on the left of the molding section on the left-hand half of the machine table. There is a separate gripper device having a gripper 2 for the right-hand molding jaws 1 and a separate gripper device having a gripper 2 for the left-hand molding jaws 1.

Those two gripper devices each have a respective separate guide and drive device for the associated separate gripper 2. The right-hand gripper device with the associated gripper 2 is arranged over the right-hand half of the machine table 1t and the left-hand gripper device with the associated gripper 2 is arranged over the left-hand half of the machine table 1t.

Also arranged at the end of the molding section 10 is a demolding device having a motor-driven rotary disk 3 for mold removal at the end of the molding section of the terminal pairs of molding jaws, that is to say to move the right-hand and the left-hand terminal molding jaws 1 away from each other.

In the illustrated case such a demolding device is arranged on the machine table 1t on the underside thereof to act on the terminal molding jaws and a corresponding demolding device (not shown in the Figures) is arranged in the upper structure of the machine table 1t to act at the top side of the terminal molding jaws. Those two lower and upper demolding devices operate synchronously acting from above and below.

The motor-driven rotary disk 3 of the demolding device is in the form of a round disk. It is so arranged that the disk surface is disposed parallel to the table surface. The disk surface rotates about the central axis of rotation directed perpendicularly on to the disk surface. The drive for the rotary disk is provided by way of an electric drive motor 1a alternately in the clockwise direction and in the counter-clockwise direction with a rotary angle of up to 90°. Four entrainment rollers 31, 31, 32, 32 are arranged in projecting relationship perpendicularly from the disk surface, on the disk surface that is towards the molding jaws. Those four entrainment rollers are arranged symmetrically as follows:

The disk surface is subdivided into a left-hand and a right-hand disk half. The subdivision line is formed by a diameter line crossed by the central axis of rotation at the center thereof.

A first entrainment roller 31 and a second entrainment roller 32 are respectively arranged in each half, wherein the first entrainment roller 31 is arranged radially further inwardly than the second entrainment roller 32, that is to say the spacing of the first entrainment roller 31 relative to the central axis of rotation 3d is less than the spacing of the second entrainment roller 32 relative to the central axis of rotation. The arrangement of the first and second entrainment rollers 31, 32 in each disk half is such that in each case the connecting line of the first and second entrainment rollers 31, 32 which are arranged in a disk half extends in parallel relationship with the diameter line. The connecting lines extend in mutually parallel relationship and the spacing of the connecting lines relative to the diameter line is the same in each case.

The arrangement of the first and the second entrainment rollers 31, 32 in the two disk halves is symmetrical relative to each other, more specifically in such a way that the first entrainment roller 31 of the first disk half and the first entrainment roller 31 of the second disk half are arranged in mirror-image symmetry relative to the central axis of rotation and in a corresponding manner the second entrainment roller 32 of the first disk half and the second entrainment roller 32 of the second disk half are also arranged in mirror-image symmetry relative to the central axis of rotation 3d.

In the demolding step the entrainment rollers 31, 32 co-operate with the molding jaws. It is essential that, in the demolding operation, in a first step, firstly the first entrainment roller 31 with its smaller effective lever arm acts on the molding jaws and then in a second step the second entrainment roller 32 with its larger effective lever arm acts on the molding jaws. With the same torque in respect of the motor-driven rotary disk 3 therefore a relatively large force acts on the molding jaws by way of the first entrainment members 31 at the beginning of the demolding operation. In the further course of the demolding procedure the second entrainment members 32 then act by way of their longer lever arm with a lower level of force on the molding jaws.

The various stages of the demolding procedure are shown in the seven FIGS. 1 through 7, using the example of the right-hand molding jaws 1.1 through 1.6. They show in detail:

FIG. 1:

The rotary disk 3 is driven in the clockwise direction. The entrainment roller 31 bears against the longitudinal inside edge of the molding jaw 1.6. The entrainment roller 31 urges the molding jaw 1.6 out of the central passage. The short lever arm is operative by way of the entrainment roller 31 and transmits a relatively high force to the molding jaws.

FIG. 2:

The rotary disk 3 is further driven in the clockwise direction. The entrainment roller 31 and the entrainment roller 32 bear against the longitudinal inside edge of the molding jaw 1.6. The entrainment roller 31 and the entrainment roller 32 urge the molding jaw 1.6 which has already been moved out by a first distance, further out of the central passage. The longer lever arm of the entrainment roller 32 is operative and transmits a lower force to the molding jaw 1.6, than in the previously illustrated stage.

FIG. 3:

The rotary disk has reached its 90° rotary position. The entrainment roller 32 bears solely against the longitudinal inside edge of the molding jaw 1.6. The molding jaw has now reached its outwardly displaced disengaged position and bears with the longitudinal outside edge against the outwardly displaced guide bar 3v. The guide bar 3v provides for stable orientation of the molding jaw parallel to the molding passage 10 in the illustrated readiness position and during the coupling procedure for the gripper 2. In the meantime in FIG. 3 the gripper 2 has been advanced to the molding jaw 1.6 which is in the readiness position and is already in engagement with the molding jaw. The rotary disk 3 is now driven in the counter-clockwise direction to rotate it back into its starting position through 90° rotary angle.

FIG. 4:

The downwardly movable guide bar 3v is now lowered into the machine table 1t. The gripper guides the molding jaw 1.6 which is held in a condition of engagement over the lowered guide bar 3v outwardly in the Y-direction and at the same time in the X-direction back in the direction towards the beginning of the molding section 10. In the meantime the rotary disk 3 is rotated back into its starting position and is now stationary. The molding jaw 1.5 is further moved in a direction towards the end of the molding section but is not yet operatively connected to the entrainment members of the rotary disk 3.

FIG. 5:

The guide bar 3v is in the meantime moved upwardly out of the machine table 1t again. The rotary disk 3 is still stationary in its starting position. The molding jaw 1.5 is now further moved into the region of the rotary disk 3 and has already come into contact with the entrainment roller 32. The entrainment roller 31 however is not yet in a contacting condition. The gripper 2 still holds the molding jaw 1.6 in a condition of engagement. It has not yet moved the molding jaw 1.6 completely into the starting position at the start of the molding section.

FIG. 6:

The molding jaw 1.5 is now further advanced to the end of the molding section 10. It bears against the entrainment roller 32. There is however still no contact with the entrainment roller 31. The rotary disk 3 is still stationary. The molding jaw 1.6 is still in engagement with the gripper 2 but has now reached the position immediately prior to being moved into position at the start of the molding section 10. It is just being moved by the gripper 2 in the Y-direction into its initial position.

FIG. 7:

The molding jaw 1.6 is now moved into its starting position at the start of the molding section 10. The engagement with the gripper 2 is just being released and then the gripper 2 is moved away in the Y-direction outwardly. The molding jaw 1.5 is now in contact with the entrainment roller 31 and with the entrainment roller 32. The rotary disk 3 is still stationary. The stage as is shown in FIG. 1 now follows directly, but advanced by one mold jaw, that is to say the demolding operation is effected in respect of the molding jaw 1.5.

Figure 2:
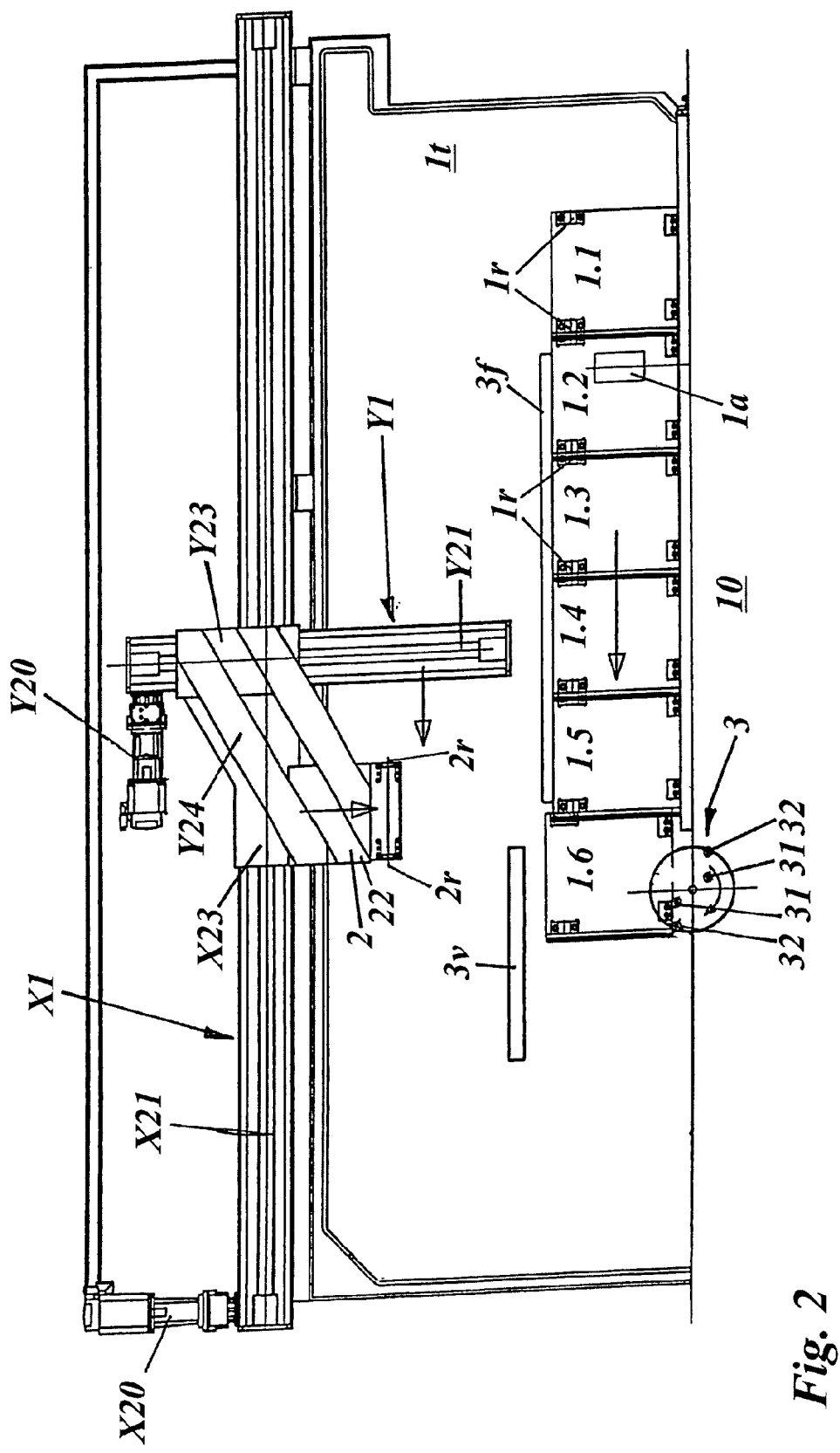
Figure 3:
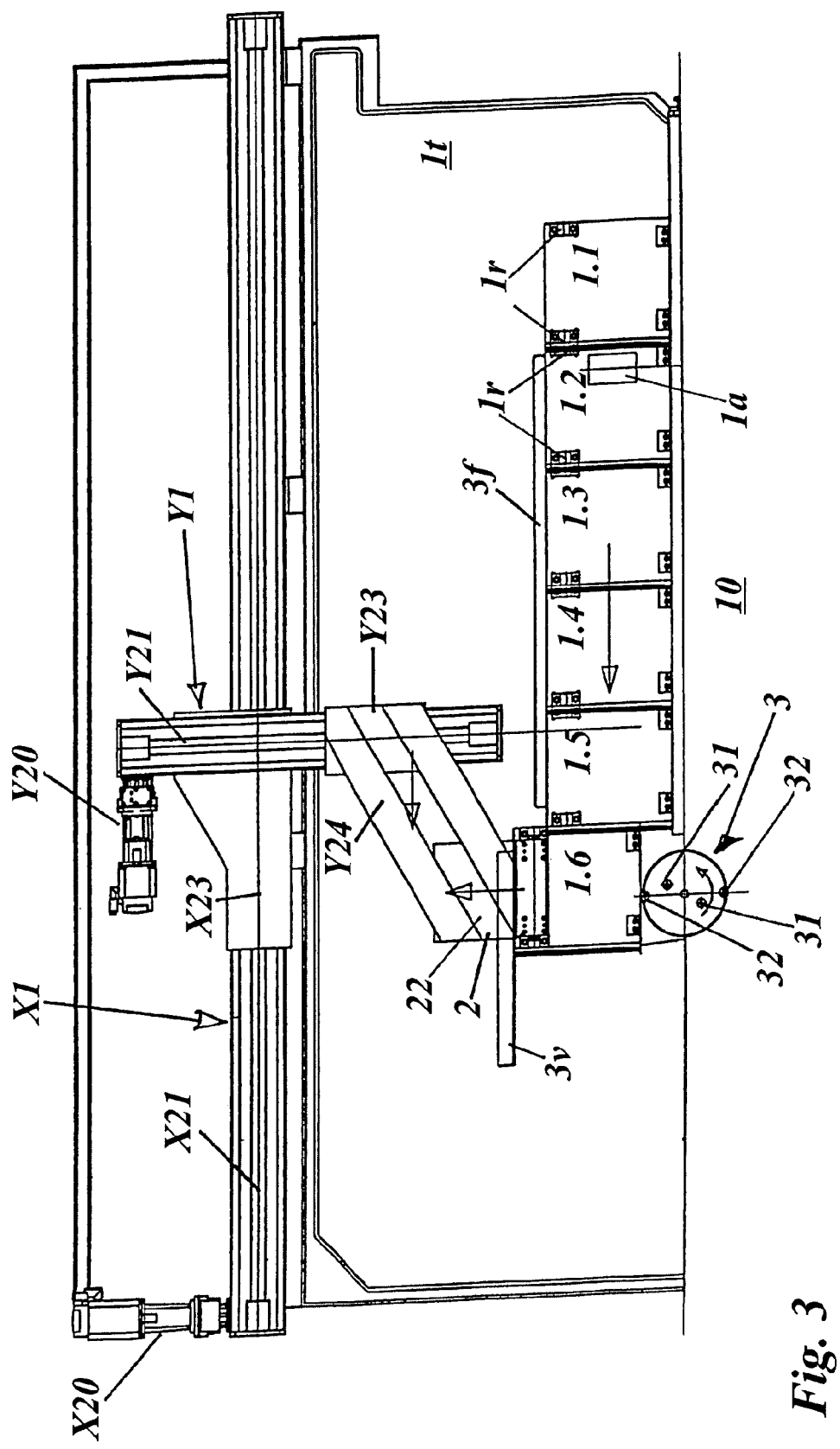
Figure 4:
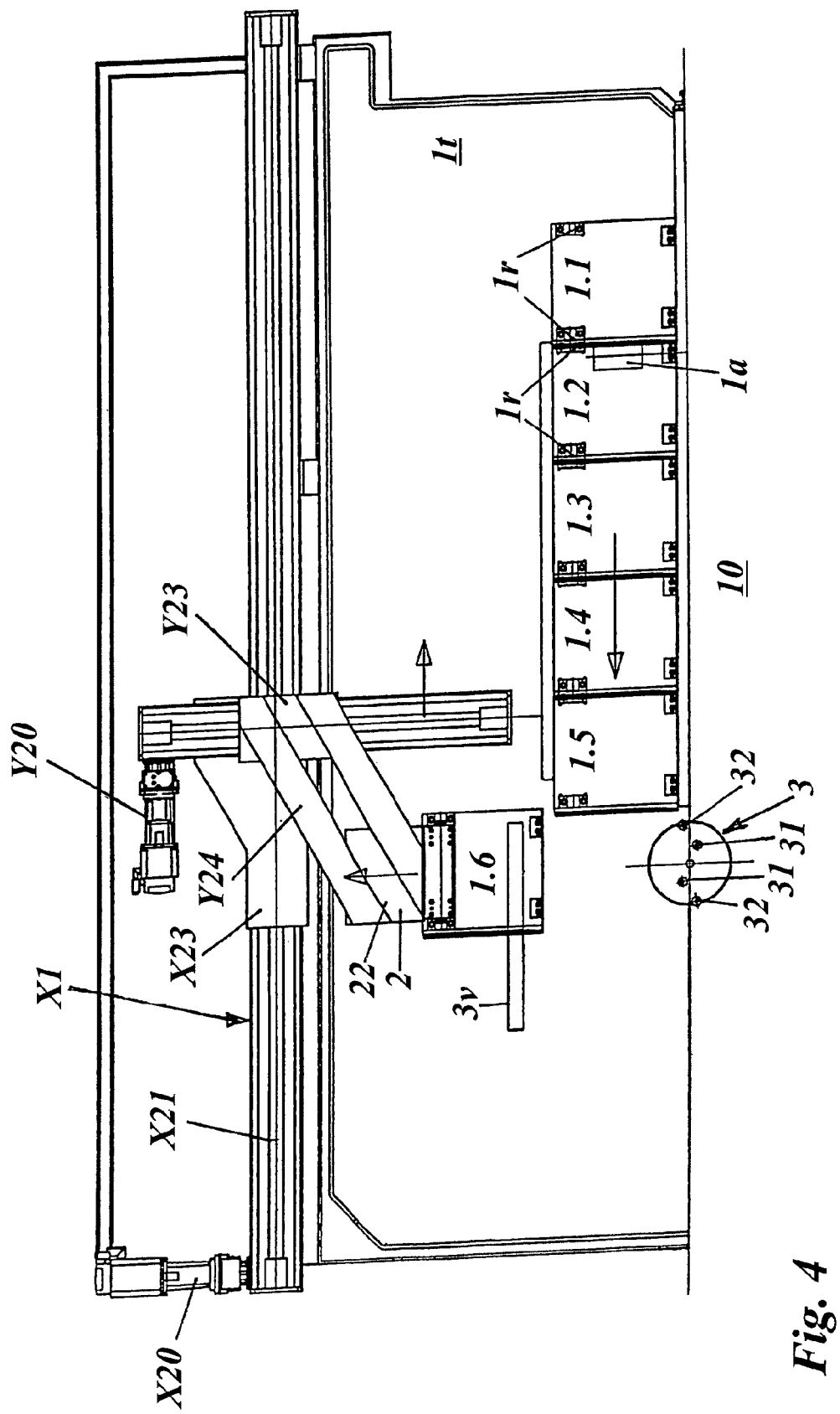
Figure 5:
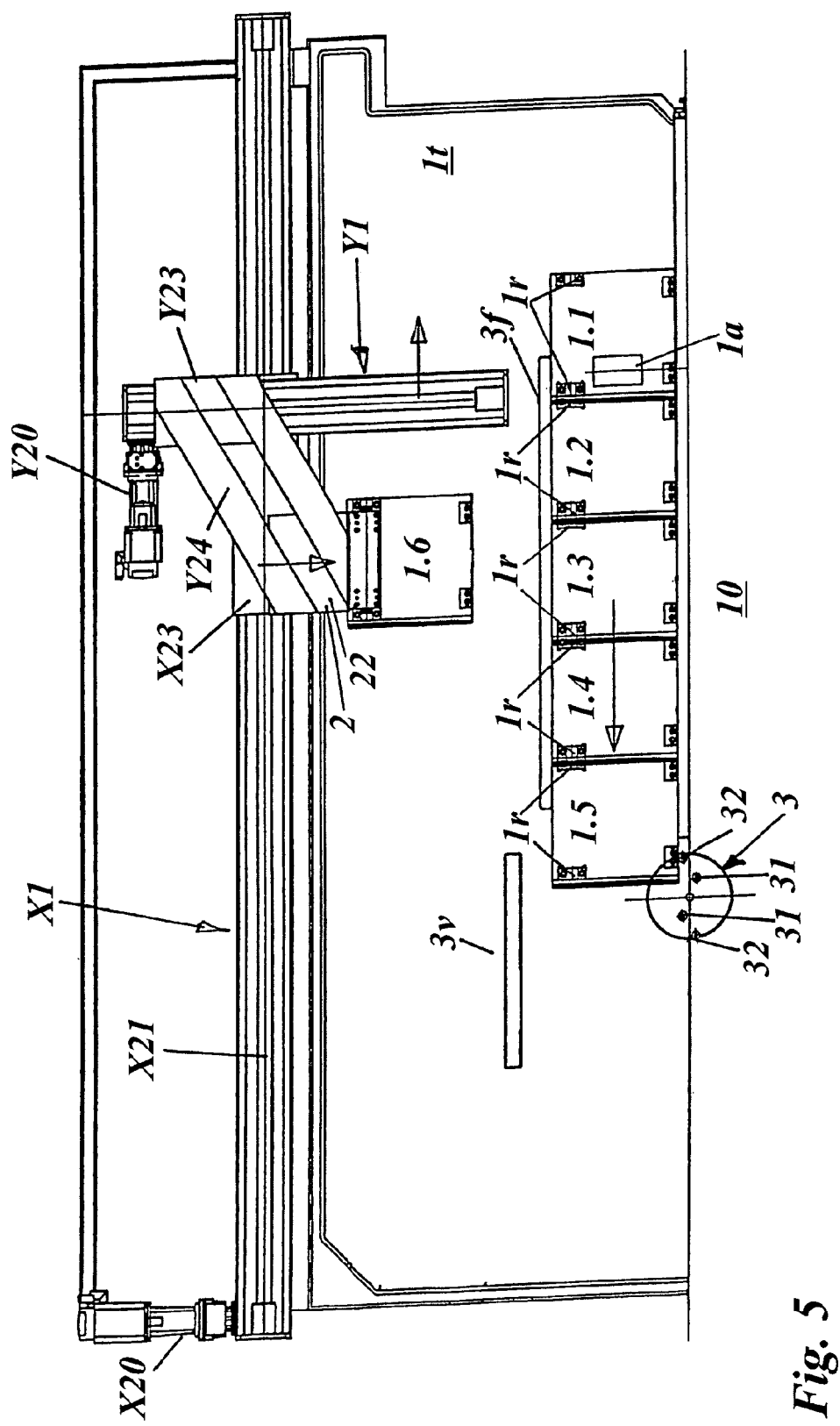
Figure 6:
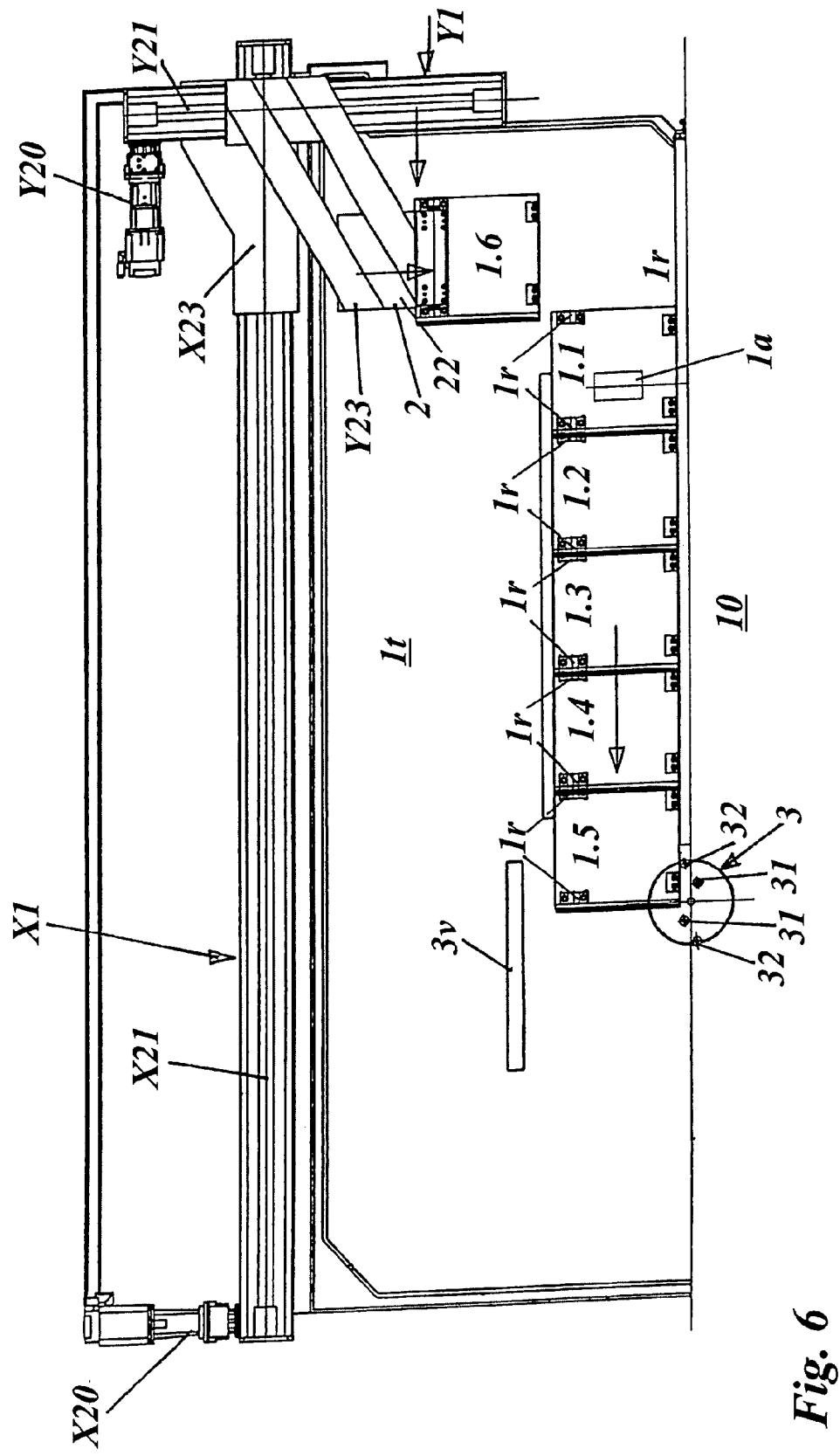
Figure 7:
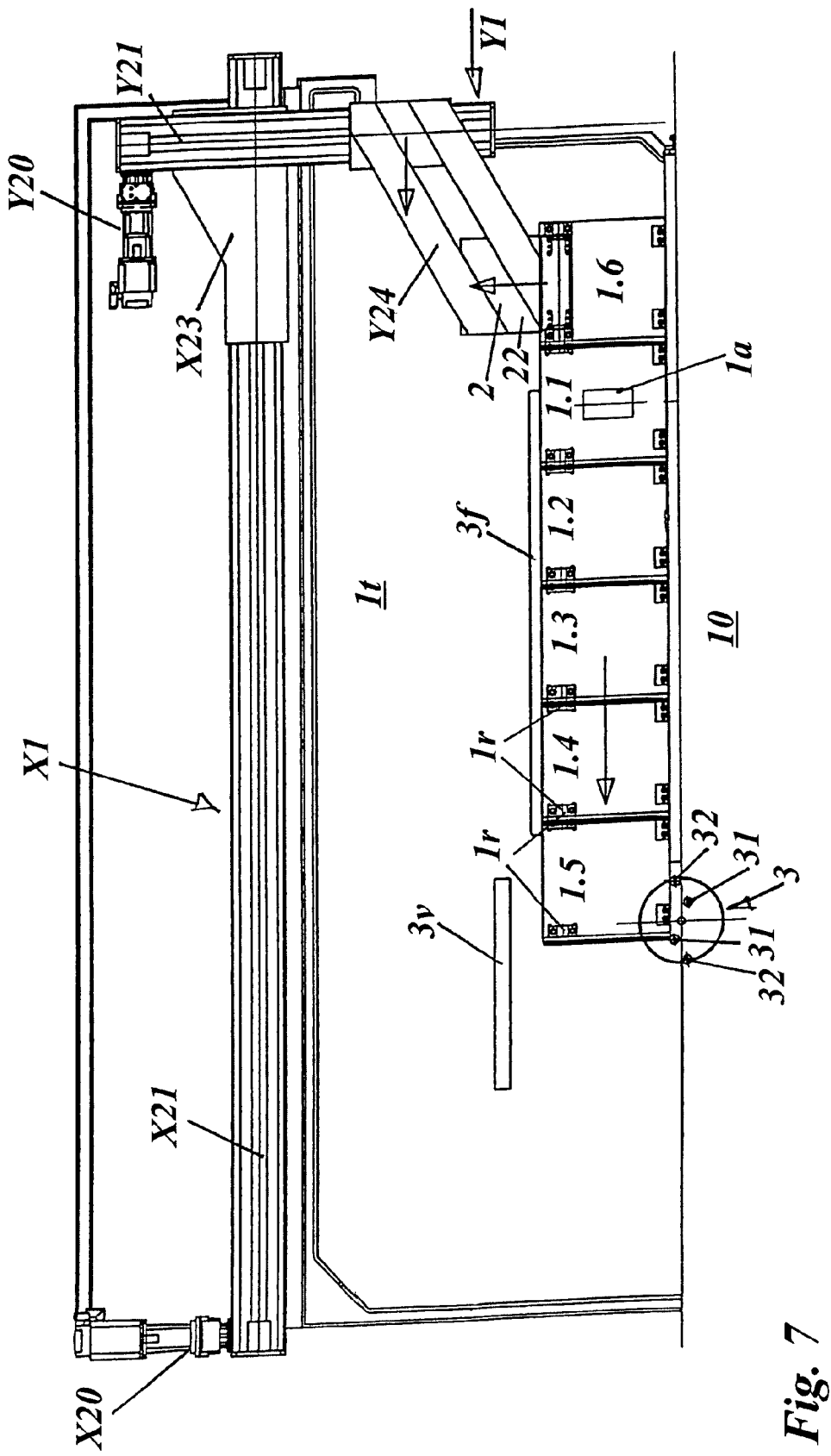

The demolding operation in respect of the left-hand molding jaws 1 is effected in a corresponding fashion by way of the same rotary disk 3, more specifically with the two further entrainment members 31, 32 acting on the left-hand molding jaws which are not shown in FIGS. 2.1 through 2.7.

The return movement of the molding jaws is effected as already mentioned by way of grippers 2, in which respect there is provided a gripper 2 with separate guide and drive device for the right-hand molding jaws and a gripper 2 with a separate guide and drive device for the left-hand molding jaws.

The structure and function of the gripper device will now be described by reference to the right-hand gripper device as is shown in FIGS. 1 through 7. The gripper device has a linear X-guide rail X1 which is installed on the machine table 1t. That guide rail X1 extends in the X-direction into the proximity of and along the right-hand outside edge of the machine table, as can best be seen from FIG. 1. It has a guide housing with an upwardly open guide slot which extends in the X-direction along the housing. A belt X21 which is driven in circulation by way of a servo motor X20 is guided in the X-direction in the guide housing. The servo motor X20 is mounted at the end on the housing of the guide rail X1. The guide slot guides an X-entrainment member X22 which is connected to the circulating belt and which is connected to a carriage X23 guided in resting relationship on the housing of the guide rail. In the plan view in the Figures the X-entrainment member X22 is covered by the carriage X23.

A Y-rail device Y1 is fixedly mounted on the carriage X23. The Y-rail Y1 extends in the Y-direction, that is to say transversely relative to the X-direction, more specifically from the X-guide rail Y1 towards the central axis, that is to say transversely relative to the axis of the molding section 10. The Y-guide rail Y1 is of a similar structure to the X-guide rail X1. It is only axially shorter. It has a Y-guide housing also with an upwardly open guide slot extending in the Y-direction. The Y-guide housing guides a belt which is motor-driven in a circulating movement in the Y-direction. The drive motor is also a servo motor Y20 mounted on the Y-guide housing. The Y-entrainment member Y22 connected to the circulating belt Y21 also engages in a corresponding fashion through the guide slot in the Y-housing and is connected to a carriage Y23 guided in resting relationship on the Y-housing. The Y-entrainment member Y22 is concealed by the carriage Y23 in the plan view in the Figures. The gripper 2 is rigidly mounted on the carriage Y23 by way of an angle support Y24. The angle support Y24 extends at an angle of about 45° relative to the Y-direction so that the gripper 2 faces with its engagement side in perpendicular relationship towards the longitudinal axis of the molding section 10.

At its engagement side the gripper 2 has a latching pin device 2r connected by way of an elbow lever mechanism to an actuating motor 22 arranged on the gripper head. The elbow lever mechanism is driven by way of the actuating motor 22 for actuation of the latching pins 2r. For engagement purposes the latching pins 2r are moved away from each other by way of the driven elbow lever mechanism. For release purposes the latching pins 2r are moved together in the opposite direction by way of the driven elbow lever mechanism. The line of movement of the latching pins 2r is a straight line on which the axes of the latching pins 2r are aligned. At the outside that is remote from the molding section 10 the molding jaws each have a respective latching hole device 1r. It includes two axially mutually aligned latching holes 1r into which the latching pins 2r of the gripper 2 can be latchingly engaged in the coupling position and latchingly disengaged.

The illustrated corrugator operates as follows:

The molten plastic tube issuing from a nozzle device (not shown) of an extruder passes through the molding passage formed in the molding section 10 by the successively arranged moving pairs of molding jaws. The molding jaws 1.1 through 1.6 are driven at the bottom side in the X-direction by way of the drive output pinion 1a of the drive motor. The molding jaws 1.1 through 1.6 are each moved back from the end of the molding section 10 to the start, by way of the grippers 2. For demolding of the pairs of molding jaws at the end of the molding section 10 the demolding device with the motor-driven rotary disk 3 is arranged at the end of the molding section 10.

The molten plastic tube is cooled in the molding passage of the corrugator and shaped, to provide a corrugated tube. At the end of the molding passage the corrugated tube in the finished shaped condition issues in the form of an endless tube.

For shaping and cooling in the molding passage the corrugator has per se known vacuum and cooling devices which are not described in greater detail in the present application.

LIST OF REFERENCES 1.1 through 1.6 molding jaws
1t machine table

1*a* drive output pinion
1*r* latching holes per gripper
1*f* fixed guide bar
2*r* latching pin device
22 latching pin actuating motor
3 rotary disk
31, 32 entrainment rollers
3*d* axis of rotation
3*v* downwardly movable guide bar
4 wedge device
10 molding section
X1 guide device in the X-direction
X20 servo motor
X21 driven belt
X22 entrainment member
X23 carriage
Y1 rail device in the Y-direction
Y20 servo motor
Y21 driven belt
Y22 entrainment member
Y23 carriage
Y24 angle support

The invention claimed is:

1. A corrugator device for shaping thermoplastic corrugated pipes out of a molten plastic tube issuing from an extrusion device
comprising moving molding jaws which circulate in a linear molding section and arranged in paired successive relationship in the molding section form a molding passage, wherein the pairs of molding jaws are formed from left-hand and right-hand molding jaws and between them enclose a cylindrical mold cavity to form the molding passage, and
a gripper device for guiding the molding jaws from the end of the molding section back to the start of the molding section,
wherein the gripper device has a gripper for the left-hand molding jaws with a separate guide and drive device and a gripper for the right-hand molding jaws with a separate guide and drive device,
wherein the guide and drive device of each gripper has an X-guide device and an X-drive device to guide and drive an X-entrainment member in an X-direction along or parallel to a central axis of the linear molding section, and a Y-guide device and a Y-drive device for guiding and driving a Y-entrainment member in a Y-direction-transverse to the X-direction,
wherein the X-entrainment member is coupled to the Y-guide device to entrain the Y-guide device in the X-direction and the Y-entrainment member is coupled to the gripper to entrain the gripper in the Y-direction, or the Y-entrainment member is coupled to the X-guide device to entrain the X-guide device in the Y-direction and the X-entrainment member is coupled to the gripper to entrain the gripper in the X-direction, and
wherein the X-guide device and the Y-guide device respectively have first and second belts driven in circulating relationship along the X- and Y-directions respectively and the X-entrainment member and the Y-entrainment member respectively are coupled to the first and second belts which are driven in circulating relationship in the X- and Y-directions respectively.

2. The corrugator device as set forth in claim 1, wherein the X-guide device is arranged on a machine table forming the plane of movement of the molding jaws and the Y-guide device coupled by way of the X-entrainment member is guided movably on the X-guide device in parallel relationship over the machine table.

3. The corrugator device as set forth in claim 1, wherein the Y-guide device is arranged on a machine table forming the plane of movement of the molding jaws and the X-guide device coupled by way of the Y-entrainment member is movably guided on the Y-guide device parallel to the plane of the machine table.

4. The corrugator device as set forth in claim 1, wherein a housing or carrier of the X-guide device carries an X-drive device and a drive output member of the X-drive device movably drives the X-entrainment member along the X-guide device.

5. The corrugator device as set forth in claim 1, wherein a housing or carrier of the Y-guide device carries a Y-drive device and a drive output member of the Y-drive device movably drives the Y-entrainment member along the Y-guide device.

6. The corrugator device as set forth in claim 1, wherein the gripper has a gripper head which has at least one latching pin or latching clamp device actuated by way of a motor for engagement with the molding jaws.

7. The corrugator device as set forth in claim 6, wherein the latching pin or latching clamp device has, respectively, two latching pins or latching clamps which are movable in opposite relationship.

8. The corrugator device as set forth in claim 6, wherein the latching pin or latching clamp device is actuable by way of an elbow lever mechanism driven by the motor of the gripper.

9. The corrugator device as set forth in claim 1, wherein the gripper is rigidly connected to the entrainment member carrying the gripper.

10. The corrugator device as set forth in claim 6, wherein the gripper is arranged on the entrainment member carrying the gripper in such a way that the gripper head faces with its end face carrying the latching pin or latching clamp device towards the axis of the molding passage in the Y-direction.

11. The corrugator device as set forth in claim 6, wherein the molding jaw has a latching hole device co-operating with the latching pin or latching clamp device of the gripper.

12. The corrugator device as set forth in claim 2, wherein the machine table is horizontally arranged.

13. The corrugator device as set forth in claim 3, wherein the machine table is horizontally arranged.

14. The corrugator device as set forth in claim 4, wherein the X-drive device is a servo motor.

15. The corrugator device as set forth in claim 5, wherein the Y-drive device is a servo motor.

16. The corrugator device as set forth in claim 9, wherein the entrainment member is carrying the gripper by way of an angle strut.

* * * * *